United States Patent [19]

Showen et al.

[11] Patent Number: 5,973,998
[45] Date of Patent: Oct. 26, 1999

[54] AUTOMATIC REAL-TIME GUNSHOT LOCATOR AND DISPLAY SYSTEM

[75] Inventors: Robert L. Showen, Los Altos; Jason W. Dunham, San Francisco, both of Calif.

[73] Assignee: Trilon Technology, LLC., Los Altos, Calif.

[21] Appl. No.: 08/904,979

[22] Filed: Aug. 1, 1997

[51] Int. Cl.⁶ ........................................ G01S 3/80
[52] U.S. Cl. ...................... 367/124; 367/129; 367/906; 367/907
[58] Field of Search .................... 367/124, 129, 367/906, 127, 128, 907

[56] References Cited

U.S. PATENT DOCUMENTS

| | | | |
|---|---|---|---|
| 3,886,553 | 5/1975 | Bates | 367/127 |
| 4,091,366 | 5/1978 | Lavallee | 340/542 |
| 5,455,868 | 10/1995 | Sergent et al. | 381/56 |
| 5,504,717 | 4/1996 | Sharkey et al. | 367/124 |
| 5,586,086 | 12/1996 | Permuy et al. | 367/127 |

FOREIGN PATENT DOCUMENTS 9305960  8/1993  South Africa .

OTHER PUBLICATIONS

Lahr, J. et al., *Location of acoustic sources using seismological techniques and software*, US Dept. of Interior, US Geological Survey, Open File Report 93–221, Menlo Park, CA 1993.

Page, B. et al., *Secures: system for reporting gunshots in urban environments*, SPIE, vol. 2497, pp. 160–172.

*Primary Examiner*—Ian J. Lobo
*Attorney, Agent, or Firm*—Lumen Intellectual Property Services

[57] ABSTRACT

A system to accurately and rapidly present the location of gunfire or other explosive events to dispatchers uses a sparse set of distributed acoustic sensors mounted on rooftops or utility poles to allow triangulation of the gunfire sounds. If a fourth signal confirms that an explosive event occurs at a position triangulated from three other signal, then the system announces an event to dispatchers. The system tests various sensor triads against various criteria and selects the best triad for making the triangulation calculation. In the case where multiple gunshots are present, the system can automatically determine a velocity, thus helping identify and respond to drive-by shootings. The system presents a confirmed location on a computer map of the protected community showing where on a specific property the gunfire occurred. The dispatchers can listen to the event and can view wave forms or spectra to assist in discriminating gunshots from other explosive events. If a dispatcher is confident that a gunshot has been detected, law enforcement officers can be directed to the reported location. A printout of the event is generated so police can later show the event location to the residents and inquire why it occurred there. A history of events is maintained for community problem-solving.

21 Claims, 6 Drawing Sheets

5,973,998

AUTOMATIC REAL-TIME GUNSHOT LOCATOR AND DISPLAY SYSTEM

FIELD OF THE INVENTION

This invention relates generally to systems and methods for discriminating explosive events, such as gunshots, from other urban sounds and for determining their locations. More particularly, it relates to systems and methods which use a collection of spatially separated acoustic sensors and signal processing techniques to determine gunshot locations in real-time and display them.

BACKGROUND OF THE INVENTION

The increasing incidence of gunfire in urban areas is an unfortunate and troublesome development in many modern cities. In addition to addressing this problem with conventional police measures, strategies for effectively responding to specific gunfire incidents would be useful. In particular, the ability to quickly locate gunshots in an urban area can help quicken the response of law enforcement officials and medical rescue teams to the location of the gunfire. In addition, delayed response by community-oriented police officers can help inhibit repeat offenders.

J. C. Lahr and F. G. Fischer, in the article "Location of Acoustic Sources Using Seismological Techniques and Software," Open-File Report 93-221, United States Geological Survey, Menlo Park Calif., 1993, report of an experiment in the summer of 1992 to locate gunshots using earthquake location software and microphones distributed in an area suffering gunfire. The experiment used as acoustic sensors 5 radio walkie-talkies with an average separation of 700 ft. to transmit signals to a central site where a computer analyzed the signals. Seismological software was adapted to a two-dimensional geometry with a constant sonic velocity. Impulsive events were flagged automatically by the computer and data around those events were saved for analysis later. Typically every 24 hours an operator inspected the data and determined manually the onset times of the 5 sensors for each event. Many potential gunfire locations were found in a 3-month experiment. The experimenters were able to demonstrate on two occasions that sounds from gunfire allowed triangulation to the correct location (from finding a spent shell and a broken window).

Although this proof-of-principle experiment demonstrated the scientific ability to locate urban gunfire, its capabilities did not extend to a reliable and operational system useful for law enforcement dispatch. In particular, the system did not provide an automatic real-time determination of the gunshot locations and times, was not able to reliably discriminate between explosive events and other loud urban noises, did not have an automatic event alerting signal, and did not automatically indicate rapidly the gunfire location on a map to facilitate dispatching.

In U.S. Pat. No. 5,455,868 issued Oct. 3, 1995, Sergent et al. disclose a technique for discriminating gunshot signals from other loud signals. The technique is presumably suitable for short-range detection and alarm, and does not provide a useful system for long-range detection over a large area. Moreover, the rise and fall times used by Sergent to discriminate gunshots are about ten times longer than experimentally determined times of actual gunshots. Consequently, Sergent's method can not properly discriminate gunshots from many other events.

A system for detecting and reporting urban gunshot events is disclosed by Edward Page and Brian Sharkey in "SECURES™: System for Reporting Gunshots in Urban Environments", *Public Safety/Law Enforcement Technology*, Proc. SPIE 2497, 160–172, 1995. A similar system is disclosed by Sharkey et al. in U.S. Pat. No. 5,504,717 dated Apr. 2, 1996. The system detects potential gunshot signals using a dense grid of "pole units", i.e. a collection of microphones placed on utility poles at every street corner (i.e. about every 500 ft.) in an urban area to be covered. Since this high density grid requires more than 80 sensors per square mile covered, it is very expensive to deploy and maintain. Sharkey does not, however, disclose or suggest any method for reducing the number of pole units required by his system, and overcoming this significant disadvantage.

The acoustic signals at each pole unit are analyzed to identify potential gunshot events. In particular, if a signal at a pole unit is 5 times louder than the average noise level, then an event is reported. A central processor uses the relative time data from reported events to perform triangulation and locate the origin of the gunshot. Sharkey mentions in general terms some signal processing techniques which may be useful in distinguishing a gunshot from other sounds. The mentioned techniques, however, apply only to the analysis of signals from single sensors. That is, these techniques are limited to discriminating gunshots from other types of sounds at each pole unit independently of the other pole units. Notably, Sharkey does not disclose any technique for detecting gunshots through the inter-dependent analysis of multiple signals from multiple pole units. Nor is it at all obvious from Sharkey what specific techniques one might use to perform concurrent analysis of several pole unit signals to improve the reliability of gunshot detection. Sharkey also does not disclose any technique for determining which of several potential triplets of sensors should be used in the triangulation to obtain the best location estimation.

OBJECTS AND ADVANTAGES OF THE INVENTION

Accordingly, it is an object of the present invention to overcome the disadvantages of prior gunshot location techniques. In particular, primary objects of present invention are to provide a gunshot detection system that requires relatively few sensors, that more reliably discriminates explosive events from other sounds, that more accurately locates gunshot events, and that provides to dispatchers a fast, automatic, real-time display of gunshot events. Other objects and advantages of the invention will become apparent from the following description and accompanying figures.

SUMMARY OF THE INVENTION

The present invention provides an automatic gunshot location system that uses a collection of widely separated acoustic sensors positioned in a region of interest. The system takes advantage of signals from multiple sensors to more reliably discriminate explosive sounds, such as gunshots, from other sounds. In addition, it more accurately locates gunshot events by properly selecting a best triad of sensors upon which to base the triangulation computation. The system also provides a rapid and precise location on a computer map for dispatchers.

The superior performance and discrimination capability of the present invention is due, in part, to the advantageous selection of the distances between sensors. In particular, the sensors are separated so as to achieve a balance between being near enough to each other for several sensors to detect explosive events, and yet being far enough so that weaker sharp impulses will not triangulate. This distance has been determined to be approximately 2000 ft. in the case of a region with residential and light industry buildings 1 to 3 stories high. (In a more dense urban neighborhood with higher average height, the sensor spacings would need to be somewhat less.) The use of such a sparse sensor network provides automatically a "spatial filtering" of the extraneous acoustic signals and is an important teaching of this invention. In addition, because the present invention requires only 6 to 10 sensors per square mile (as contrasted with 80 per square mile in prior systems), it has the advantage of being much less expensive to deploy and maintain. Surprisingly, the larger spacing between the sensors can be used to actually improve the discrimination of explosive events. Because signals from explosive events are able to travel significantly farther than other sounds having similar rise times, the distance between the sensors can be used as a spatial filter to assist in discriminating explosive events. Thus, by reducing the number of sensors, not only is the expense of the system reduced, but, surprisingly, the increased spacing between sensors improves the performance of the system.

The present system is characterized by additional advantageous features. Reliability is further improved by the requirement that a fourth signal be present to confirm a candidate location determined from three triangulated signals. The fourth signal may be a signal from another sensor, or a signal from a subsequent gunshot at one of the three sensors used for triangulation. This technique of confirming events reduces the number of false reports and improves the reliability of the system.

The present system also provides for improved accuracy in location determination by selecting the most appropriate triad of sensors upon which to base the triangulation calculation. It also is capable of recognizing multiple gunshot events and calculating a velocity in the case of a drive-by shooting.

In the present system, the location of a confirmed gunshot is presented on a displayed map of the region, so that it may be readily determined where the gunfire occurred. In addition, the sound of the event is readily available for audio playback so that it can be used by police dispatchers to discriminate between types of explosive sounds. Both an overview map showing the whole coverage area with recent events superimposed, and a submap which automatically pops up when a new event occurs are available on a computer display.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
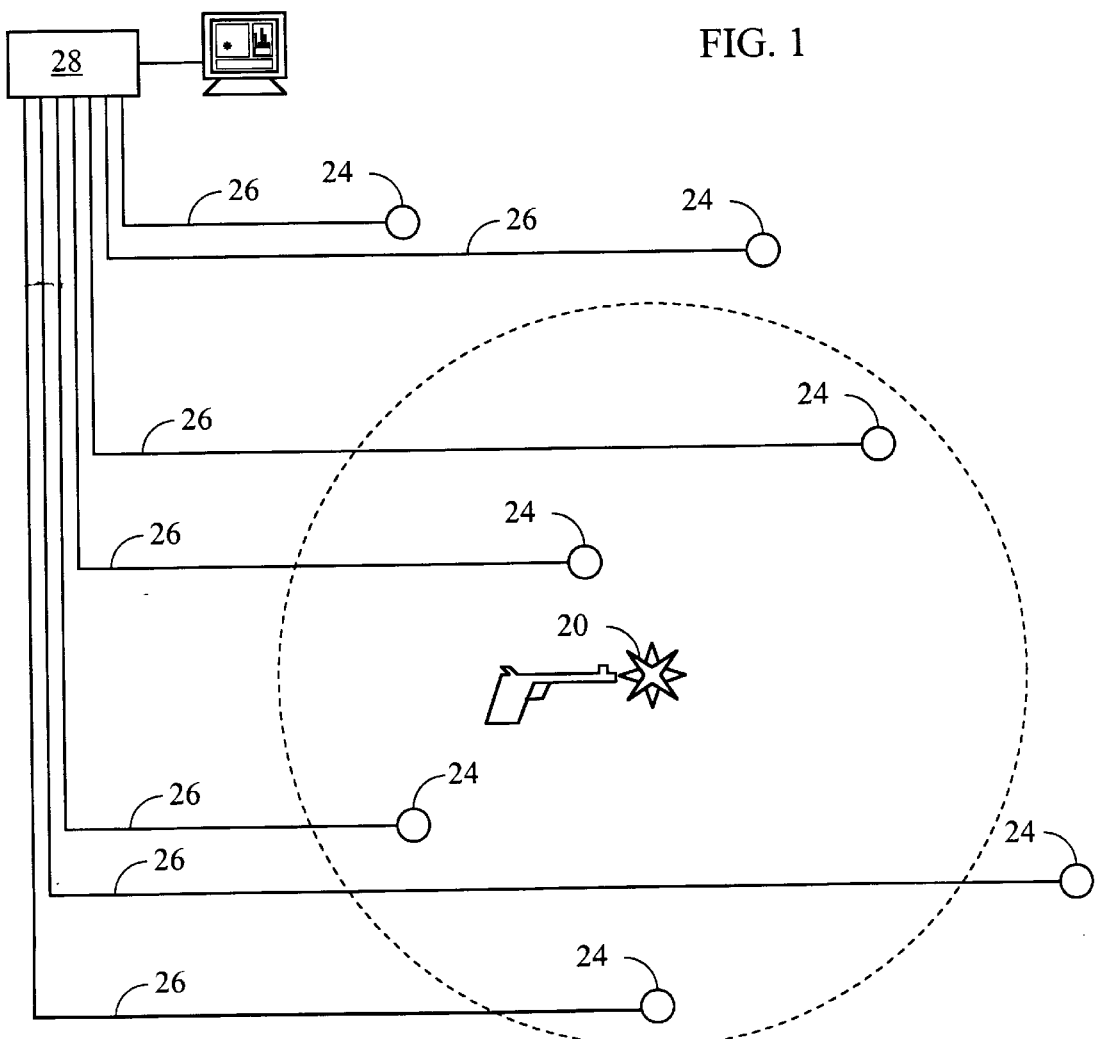
FIG. 1 is a schematic of a gunshot locating system according to the present invention.

A preferred embodiment of the invention is shown in FIG. 1. A set of sensors 24 is distributed in a contiguous region of interest, such as an urban community. The sensors are positioned to have an average nearest neighbor separation of roughly 2000 feet. The sensors are typically microphones mounted on the rooftops of buildings, on utility poles, or other similar structures that allow detection of acoustic signals as directly as possible from distant sounds arriving nearly horizontally. The microphones are placed in enclosures protected by foam or steel wool against sounds which would be produced by wind and rain impinging on the microphones in the absence of that protection. Communication links 26, such as telephone lines, connect the sensors 24 to a computer 28 which performs signal processing functions to discriminate the acoustic impulses of gunfire from the plethora of other sounds typically present in an urban community.

Strong explosive sounds, e.g. gunfire sounds, are sounds of acoustic strength in the range of 140 to 160 decibel sound pressure level referenced to 1 meter (dB SPL re 1 m). Such sounds are typically detectable in cities against variable background noise to a distance on the order of one mile from the shot. This distance decreases in the daytime, and increases at night, as the background noise varies between about 65 dB SPL and 45 dB SPL. The typical urban environment is replete with weaker impulsive sounds such as dog barks, car door slams, bouncing balls, hammering, crashing garbage cans, and chirpy bird songs. More continuous but variable sounds such as train whistles, aircraft, and motorcycles round out the acoustic environment against which the gunfire must be sensed. Of all the impulsive sounds, only the explosions such as firecrackers or backfires approach the strength of gunfire sounds.

The magnitude of the weaker non-explosive impulsive sounds are almost always under 120 dB SPL re 1 m, so their strengths are at least 20 dB below that of gunfire. In an environment in which acoustic signal strength falls inversely with the square of the distance traveled (which is the case for an environment without significant tall buildings, atmospheric absorption or refraction) such weaker non-explosive impulsive sounds are distinguishable from noise only up to one tenth the distance at which gunfire is distinguishable from noise. Accordingly, a wide spatial separation of sensors acts to filter out the weaker non-explosive impulsive sounds and improves the performance of the system. This insight is the technical basis for the "spatial filtering" concept that is a key to the present invention.

To illustrate explicitly the problem of discriminating various events, consider the following examples. Dog barks can be discriminated against because they are not as abrupt as gunfire. Discarding them outright without attempting to triangulate them reduces the computational complexity of the system. Discriminating only on the basis of abruptness, however, is often insufficient because many sounds are quite abrupt. For example, a bouncing ball located 100 ft. from a sensor can produce an impulse similar to that from gunfire located 4000 ft. away. Attempting to triangulate on the basis of these weak abrupt signals would place an unnecessary burden on the computational resources. Because the strength of a bouncing ball is so much weaker than that of a gunshot, however, spatial filtering can eliminate these weaker signals. By using several stages of filtering in a winnowing process, limited computational resources are not overloaded with spurious events.

In order to triangulate locations of gunshot events, several microphones are placed at accurately known positions which are selected so that at least four sensors are within the detectability range of any location, e.g. within the dashed circle shown in FIG. 1. We have empirically discovered that too large a spacing (e.g. 3000 ft.) results in a low probability of determining a location of a gunshot. On the other hand, too small a spacing burdens the processor with spurious weak events and also increases the expense of the system. In addition, at a small sensor separation (less than 1000 ft.), there is larger probability that events weaker than gunfire can be detected at more than one sensor, and hence can be confused with gunfire. A distance of approximately 2000 ft., however, is far enough that it excludes weaker events while being near enough to allow gunshots to be located with high probability. The preferred average nearest neighbor separation of sensors, therefore, is between 1000 and 3000 ft., with the optimal separation being approximately 2000 ft. It should be noted that with more sensitive microphones having responses predominantly in the horizontal plane, the optimal sensor spacing may be increased beyond the presently preferred separation of about 2000 ft.

In the context of the present description, to triangulate means to use the relative arrival times (and/or direction of arrival information) of signals received from at least three sensors to determine the location of the signal source. Specific algorithms to perform triangulation are well known in the art. For example, the method can be performed by calculating an intersection of two or more hyperbolas, or from a matrix inversion. The triangulation can be performed in either two or three dimensions as required, and a matrix inversion method can use more than three sensors to achieve a best fit location. In addition, other specific techniques of location determination may also be used in conjunction with the teaching of the present invention, and are included within its scope.

Various methods of communicating signals from the sensors 24 to a central site computer 28 are possible. For example, the continuous audio signals can be passed over wired or wireless communication channels. The raw acoustic data can be sent to computer 28, as shown, or a remote processor at each sensor can be used to partially characterize an impulse as a possible gunshot, and then the arrival time and amplitude or other intrinsic characteristics of the signal can be sent to the central site 28. The first method of continuous audio data transmission can be accomplished by telephone, cable, radio, optical or other medium. This continuous transmission from many sensors permits the central site to completely control the processing and allows the sounds to be presented to the dispatchers to permit human discrimination between different types of explosive events. The second method with a remote processor at each site communicates to the central site impulse data likely to contain gunfire, thus unburdening the network significantly. The valuable raw data snippets for the communicated impulses can also be sent, allowing dispatchers to hear the events and allowing for cross-correlation analysis.

Figure 2A:
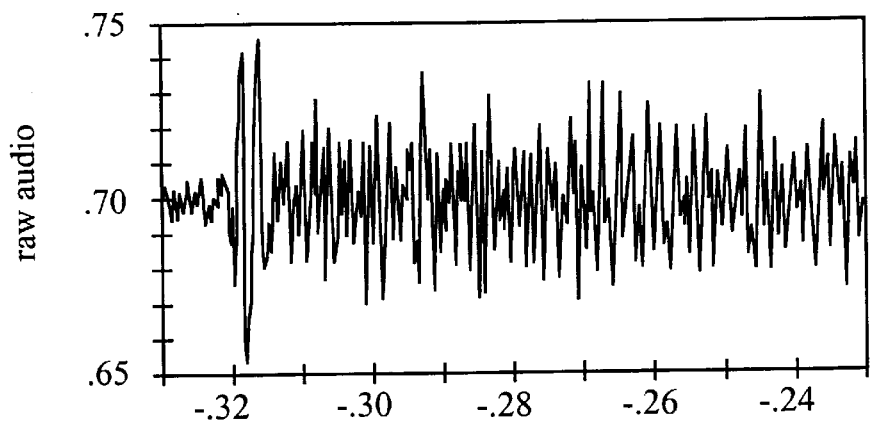
FIG. 2A shows an example of a moderate strength raw audio signal detected by a distant sensor according to the present invention.
Figure 2B:
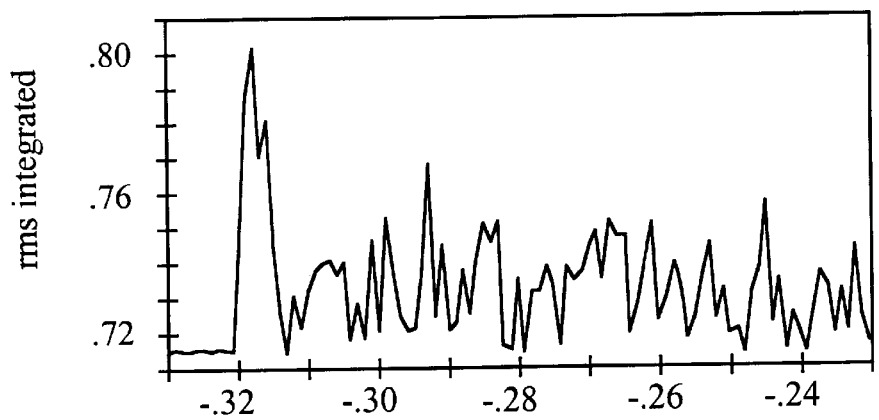
FIG. 2B shows an RMS integrated signal derived from the raw signal of FIG. 2A according to the present invention.

A graph of a detected audio signal amplitude with respect to time (in seconds) is shown in FIG. 2A. In the preferred embodiment, the computer 28 calculates from the raw audio a running RMS average of noise levels on each of the sensors. FIG. 2B is a graph of the integrated RMS signal calculated from the raw audio in FIG. 2A. If any sensor has an instantaneous amplitude greater than a fixed multiple (typically 3) of the average noise noise level over the preceding 10 sec., then the data containing that potential impulse is inspected further with an abruptness, or sharpness, test as described below. Such a "noise riding" threshold is used to detect impulses against variations in background noise levels from day to night, and against loud, transient, quasi-continuous sounds (e.g., aircraft, trains, motorcycles) without overloading the next-stage testing with too many random sounds.

Explosive sounds have an abrupt onset compared to many other transient sounds such as dog barks, bird songs, or car door slams. After the data from one sensor has passed the amplitude threshold test described above, it is tested for its abruptness. The effect of this test is to select against loud, but slow-rising, transients which are unlikely to be gunfire. The part of the gunfire sound of interest is the muzzle blast and not the bullet sound. Bullets have a weaker sound and are often fired into the air and thus are not likely to pass near a sensor. Moreover, many bullets are supersonic and require an elaborate calculation method with multiple direction finding sensors to determine their point of origin.

The abruptness of the muzzle sound depends on the distance of the shot location from a given sensor, as the high frequency sound components are attenuated more rapidly than the lower frequencies. We have found that a band-limited telephone channel of 3.5 kHz is sufficient for the purposes of discriminating between the abruptness of non-explosive and explosive events. A telephone line is not sufficient, however, to permit discrimination between a muzzle blast and the "N-wave" of a supersonic bullet.

The abruptness, or sharpness, of a signal which exceeded the average noise level threshold is determined as follows. First, a short segment of audio data, up to 0.5 sec long, containing the signal is transformed into a "sharpness domain" by several steps. The analog signal segment is digitized at, for example, a 12 kHz rate. Each one ms of data is replaced by its RMS value, producing a sequence of RMS values, $r_1, \ldots, r_N$ representing the 0.5 sec segment. A sequence of sharpness values $s_1, \ldots, s_N$ is derived from the sequence of RMS values in accordance with the following equation:

$$s_i = \frac{\max\{r_{i+1}; r_{i+2}\}}{\max\{r_{i-1}; r_{i-2}; r_{i-3}; r_{i-4}; r_{i-5}\}} - 1.$$

Figure 2C:
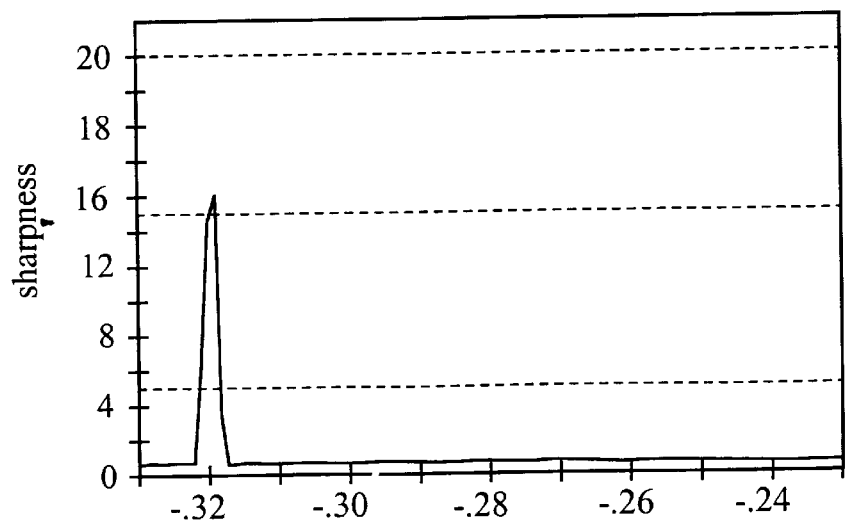
FIG. 2C shows a sharpness profile derived from the RMS signal of FIG. 2B according to the present invention.

That is, the sharpness value at a given point is the ratio of the maximum RMS within a 2 ms interval after the point to the maximum RMS of a 5 ms region preceding the point, minus one. A running calculation of this value in steps of 1 ms gives a sharpness profile in which gunfire stands out as large peaks. FIG. 2C shows the sharpness profile of the RMS signal shown in FIG. 2B. Note that the above equation is just one example of a possible method for calculating a measure of signal sharpness, or abruptness. The equation can be altered in many ways, such as by using averages rather than maxima in either the numerator or the denominator. Or, an entirely different type of equation can be used. This sharpness value is similar to an asymmetrically-calculated derivative over an interval, and the essential feature is that it measures the sudden or abrupt increase in the strength of a signal over its recent past. If the sharpness profile from a single sensor passes an "initial sharpness threshold," then the audio data for all sensors over a time interval long enough for sound to traverse the sensors, say 5 sec, is converted into the sharpness domain.

Although the above technique for detecting sharp signals is effective and computationally simple, there are many other techniques for recognizing sharp signals which may be used as well, and the present invention is not limited to any particular method of detecting sharp signals. Accordingly, for the purpose of the present description, a "sharp signal" means any signal whose energy abruptly (i.e., within a few ms) rises significantly above its average value.

The sharpness is converted to a decibel (dB) scale and compared with a threshold value. The present system is characterized by the use of several distinct threshold values. The thresholds are calibrated empirically to accept gunfire but reject many common neighborhood impulses. Three sharpness thresholds are used: $S_i$ is the initial sharpness threshold, $S_t$ is the triangulation sharpness threshold, and $S_c$ is the confirmation sharpness threshold. They are used with descending values of approximately 20 dB, 15 dB, and 5 dB, respectively. The signal shown in FIG. 2C, for example, qualifies for a triangulation or confirmation signal, but would not qualify as an initiation signal. These distinct threshold values help to improve the performance of the system by taking advantage of the fact that sharpness decreases with distance traveled. By subjecting an initial signal to a more restrictive threshold test, many false events are effectively filtered. Conversely, by not subjecting triangulating and confirming signals to such restrictive thresholds, actual gunshot events, which may not be so sharp due to the distance traveled, are not rejected.

If impulses from three sensors pass $S_t$ then relative arrival times are calculated for those impulses, using the first impulse in each sensor to surpass $S_t$, and an attempt is made to triangulate these impulses. If they can be triangulated, then a candidate location is produced. Only explosive sounds (gunfire, backfires or firecrackers) loud enough to reach widely spaced sensors can be triangulated to become candidate gunfire events.

Explosions are not the only producer of abrupt impulsive urban sounds. A hammer strike or a bouncing ball near a sensor produces sharp impulses which could potentially be from distant explosions. Typically these do not result in a spurious system response because only sounds loud enough to reach three widely-spaced sensors can triangulate. This discrimination against weak but sharp impulses by the array is called "spatial filtering." Although different hammers or bouncing balls near three sensors could randomly occur and simulate a single loud event, the probability of such a coincidence is small.

To confirm that a candidate event originates from a single event at the computed location, the expected arrival times of that sound at other sensors are calculated, and it is required that a fourth sensor pass the $S_c$ threshold at the required time within a tolerance of about 60 ms, i.e. within about a 60 ft. tolerance. Then and only then is a candidate located event considered a "confirmed event." If more than four sensors confirm the event, that is an even stronger indication that the event is genuine and the location is correct.

An alternate method to confirm that the candidate triangulation is actual and not random is to obtain angle of arrival (AOA) at several (or all) sensors from the impulses. This can be accomplished, for example, by measuring phase differences between very closely spaced microphones at a given site. In this case, the triangulated solution and the place where the angles intersect must match within a specified tolerance in order to confirm the location.

One problem in automatic event location arises when four or more sensors detect the same event. In this situation, there is a choice of which sensor signals to use, and it is desirable to select the best triad for triangulation. After the sharpness threshold $S_t$ is passed on several sensors, the present method selects the best triad by testing them against four criteria in priority order, i.e. if several triads pass the first criterion equally, then they are tested against the second criterion, and so on. The criteria are:

(1) select that trio of sensors which gives the greatest number of confirming impulses from other sensors.

(2) select that trio which produces the most widely-spread direction vectors to the event (and hence the most geometrically robust solution).

(3) select that trio which has the highest sum of sharpnesses.

(4) select that trio which gives, among the calculated locations from all possible triads, the most central location.

In the list above it is best if the impulses are quantified as being similar to each other, using, for example, cross-correlations between pairs of impulses on different sensors. The cross-correlation technique helps to weed out a false (i.e., non-correlating) impulses when more than one impulse is present in the 5 sec. of data from a given sensor. In alternate embodiments of the invention, the order of the above criteria is changed. Moreover, other similar criteria can also be used without departing from the scope of the invention.

Figure 3:
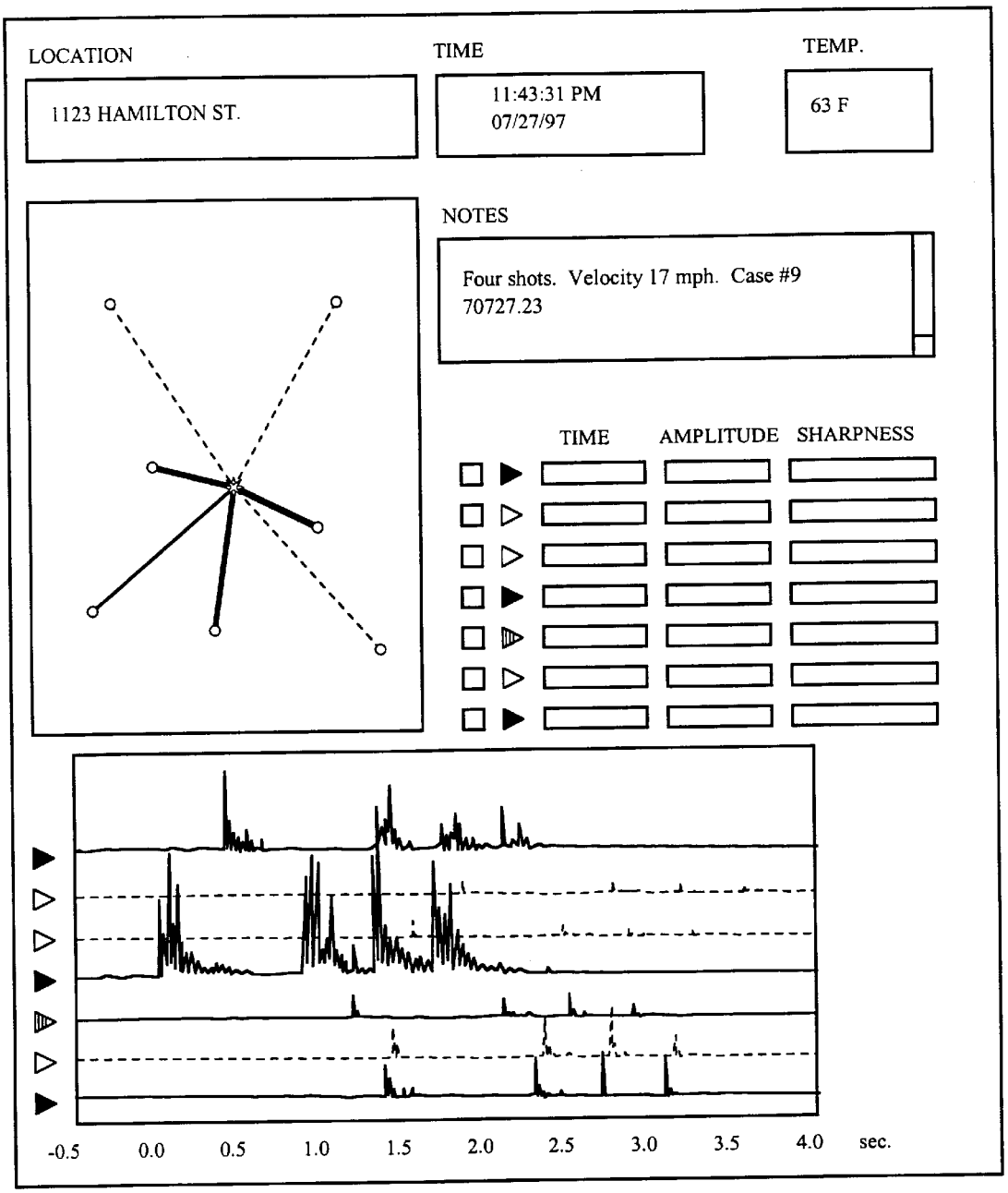
FIG. 3 shows a computer display of a gunshot event according to the invention, including RMS signals from multiple sensors and a diagram showing the event location and indicating which three sensors were used for triangulation.
Figure 4:
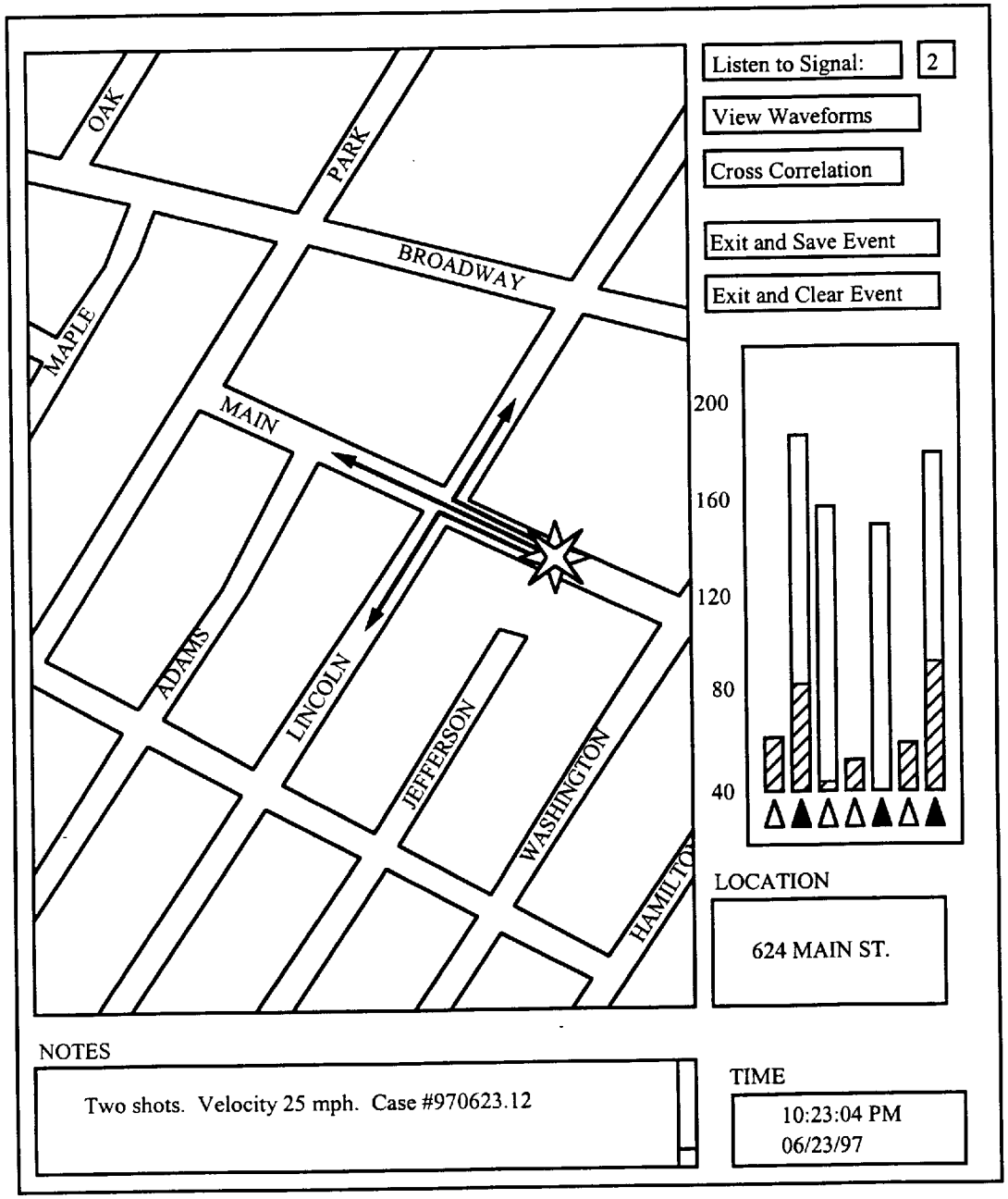
FIG. 4 shows a computer display of a gunshot event according to the invention, including an event position indicator superimposed on a community map, an event time, an event address, and RMS signal and noise levels from multiple sensors.

A "confirmed event" is presented to a dispatcher on a local map on a computer screen, and the precise position is indicated by a symbol. FIG. 3 and FIG. 4 show two examples of computer display windows which may be used to present information for potential gunshot events. FIG. 3 shows a computer display of a gunshot event, including RMS signals from multiple sensors and a diagram indicating which three sensors were used for triangulation. The three bold lines indicate sensors used for triangulation, the single solid line indicates the sensor used for confirmation, and the dashed lines indicate unused sensors. As shown in the figure, a temperature setting allows the temperature dependence of the speed of sound to be accounted for by the system.

FIG. 4 shows a computer display of another gunshot event, including an event position indicator superimposed on a community map, an event time, an event address, and RMS signal and noise levels from multiple sensors. The system allows a manual override of the triad of sensors used for automatic triangulation. In addition to the graphical display shown, a sonic and visual alarm is given to the dispatchers when the computer outputs a confirmed event so the busy dispatchers do not have to continually monitor a gunshot location screen for new events. A queue of new events is produced in case several occur before the dispatchers attend to them.

The dispatcher can choose to hear or view the 5 sec snippet of audio signal so that they may assist in determining if it is gunfire or another loud, explosive event. The pattern of the impulse spectra vs time—a sonogram (usually presented as a gray-scale of the short-time Fourier transform)—can also be used to assist in discrimination. The audio sound snippets are particularly useful when either multiple gunshots or firecracker strings are present, since in these cases the listener can easily recognize and distinguish the patterns from each other. Visual and audio training of dispatchers is performed with known categories of events.

The system permits dispatchers to annotate the event record which is saved in a file for subsequent analysis or archived for legal purposes. A law enforcement organization can use the system to respond immediately or in a delayed manner. When used in a community problem solving fashion, the gunfire in the area will be reduced as the residents who are doing the shooting learn that gunfire is likely to be quickly recognized, located, and responded to.

Figure 5:
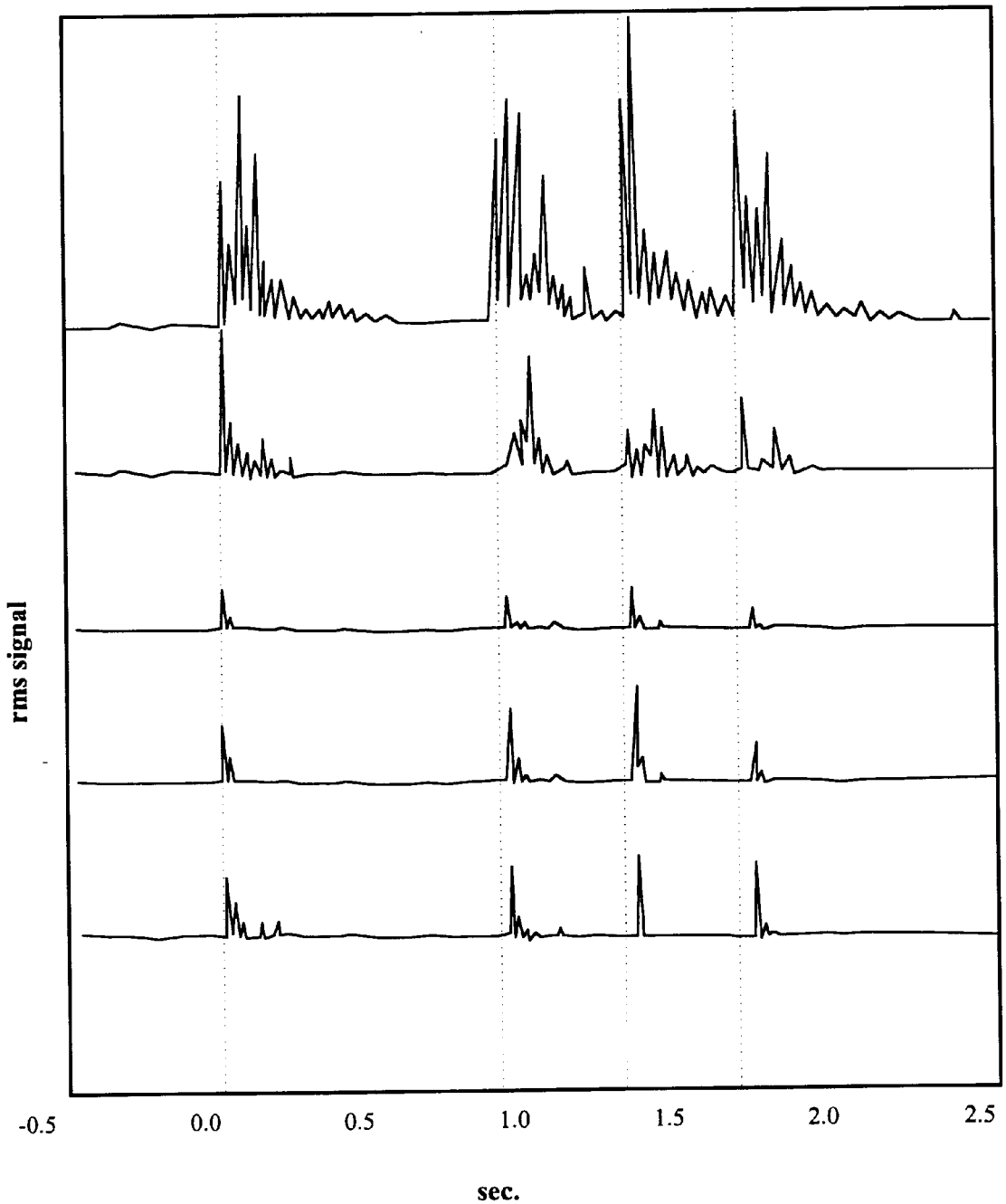
FIG. 5 is a graph of the RMS signals from five sensors which detected a series of four gunshots.

In addition to, or as alternative to, using a fourth sensor to confirm a candidate location, confirmation can be made from the detection of a multiple gunshot pattern from the same three sensors. It is easy for an operator to recognize these patterns visually and aurally in the time domain. FIG. 5 shows the RMS data from several sensors which have detected the event displayed in FIG. 3, which includes a series of four gunshots.

The signals have been shifted relative to one another in the time domain in order to align the initial shot. This alignment makes it easier to discern a multiple gunshot event. To automatically determine that multiple shots occurred (especially when they are weaker than the example of FIG. 3) is a more difficult task, primarily because reverberations often appear at different time delays at the three sensors which confuses a simple peak-detecting routine. More sophisticated techniques, however, can permit automatic discrimination of multiple gunshots from reverberations.

One method to determine automatically if multiple shots occurred is to perform auto-correlations on each detecting sensor and determine if several sensors have significant auto-correlation peaks (which correspond to the time delays between the various shots) at the same time. When two or more sensors show simultaneous auto-correlations peaks above a threshold, then multiple shots are verified, unless spacing is very irregular, in which case a firecracker string is suspected. Then either the first peak in the time domains or cross-correlation between pairs of sensors allows the relative arrival times to be obtained, and hence triangulation to occur automatically.

If the multiple shots are fired from a moving vehicle, the location change can be found and the vehicle velocity determined. Note, for example, that the last three shots shown in FIG. 5 are slightly shifted relative to each other due to movement. While the absolute locations of the shots may be in error by 20 to 50 feet, the relative accuracy of shots fired is usually within 3 feet. That is, when two shots are fired at the same location within a few seconds of each other, the apparent positions repeat within a couple of feet. The tolerances are such that if a car is traveling at 30 MPH (44 fps) and the first and last shots are separated by 1 sec, then the velocity can be specified with less than a 10% error. In the case of FIG. 5, the velocity was determined to be 17 mph parallel to the street.

When the multiple shots have a velocity, the "drive-by" shooting is usually on a street. The velocity can be determined automatically using an extension of the multiple shot verification. Since the first shot's impulse times are already known, as well those sensors having multiple shots and the time delays of those shots, then the approximate last shot times are known. Hence it is easy to search for the exact times of the last shot impulses and obtain the location of the last shot, which allows calculation of the velocity.

In the case of a confirmed "drive-by" shooting, a moving icon can be marched down a street showing the present location of the shooter assuming the velocity has not changed. When an intersection is encountered, the moving icon can be replicated to illustrate the various potential present locations, depending on the unknown turns the vehicle might have made, as indicated by the three paths shown in FIG. 4.

In addition to, or as an alternative to, delivering gunshot location information to a dispatcher in the form of a computer display, the information can also be delivered directly to computers in squad cars closest to the shooting location, or to qualified citizen block captains in the immediate area. The location information can also be converted automatically into a voice synthesized location and broadcast over police or emergency radio channels. Should the police so desire, map or data outputs—possibly delayed in time—could be released to the public by automatic posting to an internet web site.

Figure 6:
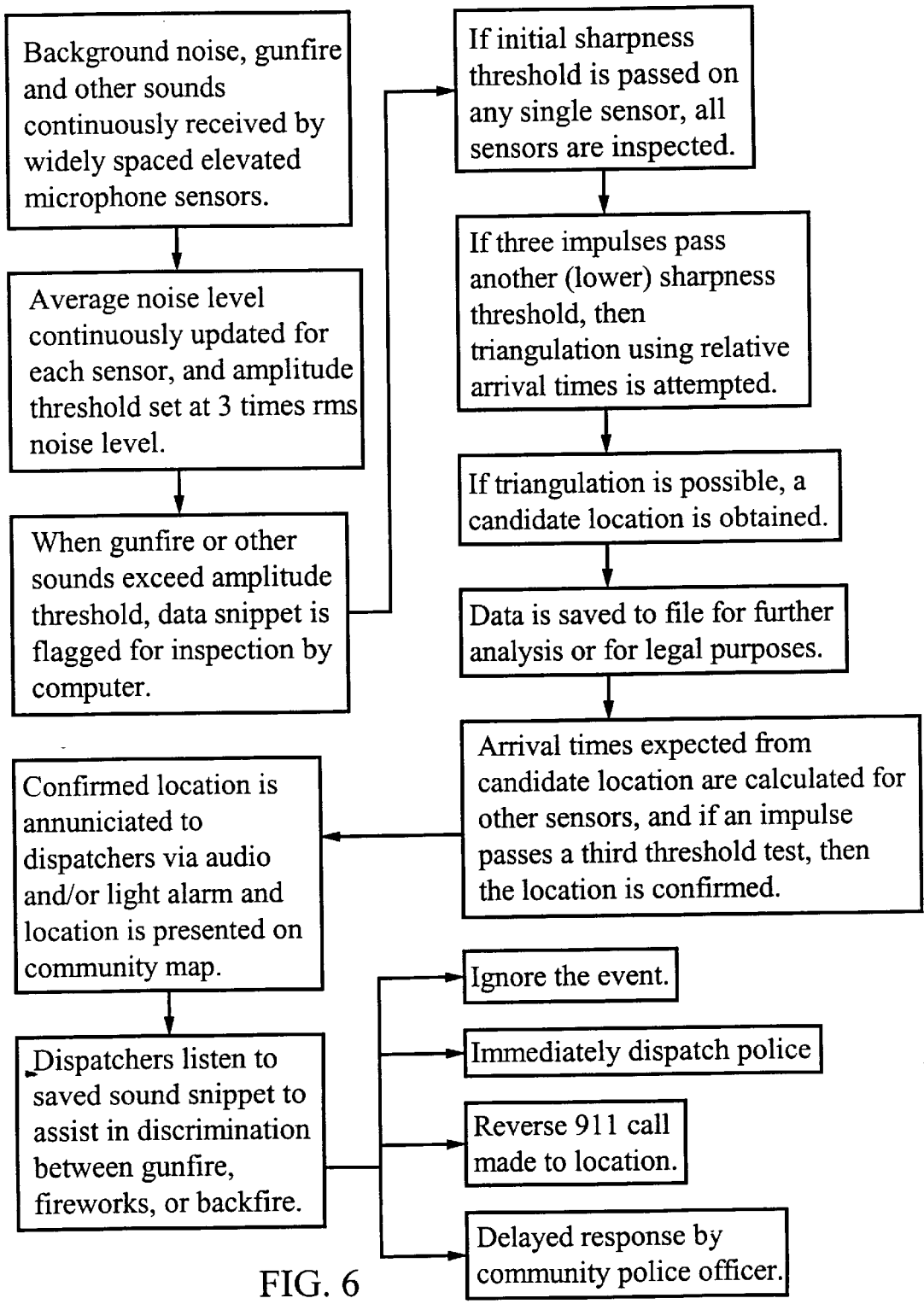
FIG. 6 is a flow diagram illustrating an overview of a procedure for locating gunshots in accordance with the present invention.

FIG. 6 shows a flow diagram of the gunshot detecting and locating procedure described in detail above. It will be clear to one skilled in the art that the above embodiment may be altered in many ways without departing from the scope of the invention. Accordingly, the scope of the invention should be determined by the following claims and their legal equivalents.

What is claimed is:

1. A system for locating a loud explosive event such as gunfire within a region containing explosive events and other weaker impulsive sounds, the system comprising:

a collection of acoustic sensors for detecting acoustic signals, wherein the acoustic sensors have distinct sensor locations within the region, and wherein the average nearest neighbor separation between the sensors is at least 1000 ft., thereby providing spatial filtering of the acoustic signals detected by the sensors; and a signal processor in communication with the collection of acoustic sensors, wherein the signal processor performs the following steps:

(a) examining the acoustic signals to identify first, second, and third acoustic signals from distinct acoustic sensors, wherein each of the identified acoustic signals has an energy abruptly and significantly rising above an average value of the acoustic signal;

(b) calculating a location in the region by comparing the identified first, second, and third acoustic signals;

whereby intrinsically weak acoustic signals are discriminated against by the large separation between the sensors, thereby improving the performance of the system.

2. The system of claim 1 wherein the location is calculated by a triangulation of the first, second, and third acoustic signals.

3. The system of claim 1 wherein the location is calculated based on angles of arrival of the first, second, and third acoustic signals.

4. The system of claim 1 wherein the examining step comprises comparing the first acoustic signal to a first threshold value and comparing the second and third acoustic signals to a second threshold value lower than the first threshold value.

5. In a system comprising a collection of acoustic sensors in communication with a signal processor, a method for locating a strong explosive event in a region containing explosive and impulsive sounds, the method comprising the steps of:

identifying from among acoustic signals detected by the acoustic sensors a first signal from a first sensor, wherein the first signal exceeds an average noise level by a significant factor;

if a first sharpness value of the first signal exceeds an initial sharpness threshold, then identifying from among the acoustic signals a second signal from a second sensor and a third signal from a third sensor, wherein the first, second, and third sensors are distinct from each other, and wherein the first sharpness value measures a degree to which an energy of the first signal abruptly and significantly rises above an average value; and if a second sharpness value of the second signal and a third sharpness value of the third signal both exceed a triangulation threshold that is less than the initial sharpness threshold, then calculating from the first, second, and third signals a location.

6. The method of claim 5 further comprising the steps of:

identifying from among the acoustic signals a fourth signal from a fourth sensor distinct from the first, second, and third sensors; and if a fourth sharpness value of the fourth signal exceeds a confirmation threshold value that is less than the triangulation threshold value, and if an expected arrival time associated with the fourth sensor is within 60 ms of an actual arrival time of the fourth signal, then reporting the calculated location.

7. A system for locating an explosive event within a region, the system comprising:

a collection of acoustic sensors for detecting acoustic signals, wherein the acoustic sensors are positioned at separate sensor locations within the region; and a signal processor in communication with the collection of acoustic sensors for locating the explosive event from the acoustic signals;

wherein the signal processor performs the following steps:
  (a) examining the acoustic signals to identify first, second, and third sharp acoustic signals from distinct acoustic sensors, wherein the identified sharp acoustic signals have energies that rise abruptly and significantly above average values of the signals;
  (b) calculating a candidate location in the region by comparing the identified first, second, and third sharp acoustic signals;
  (c) examining the acoustic signals to identify a fourth sharp acoustic signal; and
  (d) if the fourth sharp acoustic signal was identified in (c) and satisfies a criterion that confirms the calculated candidate location, then reporting the candidate location.

8. The system of claim 7 wherein the first, second, third, and fourth acoustic signals satisfy respective sharpness threshold criteria.

9. The system of claim 7 wherein step (b) comprises comparing arrival times of the first, second, and third acoustic signals at the distinct acoustic sensors, and wherein the confirming criterion is the property of having an arrival time that is within a predetermined interval of an expected arrival time.

10. The system of claim 7 wherein step (b) comprises comparing directions of arrival of the first, second, and third acoustic signals at the distinct acoustic sensors, and wherein the confirming criterion is the property of having a direction of arrival that is within a predetermined interval of an expected direction of arrival.

11. The system of claim 7 wherein the fourth sharp acoustic signal originates from a fourth acoustic sensor distinct from the first, second, and third acoustic sensors.

12. The system of claim 7 wherein the expected arrival time of the fourth sharp acoustic signal corresponds to a time at which the fourth acoustic sensor should have received a signal propagating from the candidate location.

13. The system of claim 7 wherein the sensor locations have an average nearest neighbor separation of at least 1000 feet.

14. The system of claim 7 wherein the acoustic sensors comprise an acoustic sheath to reduce noise due to rain and wind.

15. The system of claim 7 wherein the system further comprises an annunciator selected from the group consisting of an audio alarm and a visual alarm.

16. The system of claim 7 wherein the reporting of the event comprises playing a snippet of a sharp audio signal.

17. The system of claim 7 wherein the system further comprises a video display that indicates on a map of the region the confirmed candidate location.

18. The system of claim 7 wherein the signal processor further performs the step of calculating a sonogram of a sharp audio signal.

19. A system for detecting and locating an explosive event within a region, the system comprising:

a collection of acoustic sensors for detecting acoustic signals, wherein the acoustic sensors are positioned at separate sensor locations within the region; and a signal processor in communication with the collection of acoustic sensors for identifying and locating the explosive event from the acoustic signals;

wherein the signal processor is programmed in accordance with the following steps:
  (a) examining the acoustic signals to identify a first set of three sharp acoustic signals from distinct acoustic sensors, wherein the first set of three sharp acoustic signals correspond to a first candidate gunshot event and have energies that rise abruptly and significantly above average values of the first set of signals;
  (b) calculating a first candidate location in the region by comparing the identified first set of three sharp acoustic signals with each other;
  (c) examining the acoustic signals to identify a second set of three sharp acoustic signals from distinct acoustic sensors, wherein the second set of three sharp acoustic signals correspond to a second candidate gunshot event and have energies that rise abruptly and significantly above average values of the second set of signals;
  (d) calculating a second candidate location in the region by comparing the identified second set of three sharp acoustic signals with each other, and calculating a difference between the first and second candidate locations; and
  (e) if the difference between the first candidate location and the second candidate location is less than a predetermined threshold, then reporting a confirmed explosive event.

20. The system of claim 19 wherein the signal processor performs the step of calculating from the difference between the first and second candidate locations a velocity between the first and second candidate gunshot events, whereby a velocity of a drive-by shooting may be determined.

21. A system for detecting and locating an explosive event within a region, the system comprising:

a collection of acoustic sensors for detecting acoustic signals, wherein the acoustic sensors are positioned at separate sensor locations within the region; and a signal processor in communication with the collection of acoustic sensors for locating the explosive event from the acoustic signals;

wherein the signal processor performs the following steps:

(a) examining the acoustic signals to identify a set of triads, wherein each triad comprises three sharp acoustic signals from distinct acoustic sensors;

(b) identifying for each triad a number of confirming signals from other acoustic sensors;

(c) selecting a best triad from the set of triads, wherein the best triad has a largest number of confirming signals;

(d) calculating a location in the region by comparing the three sharp acoustic signals of the best triad; and (e) reporting the calculated location.

* * * * *